United States Patent [19]

Cottrell et al.

[11] Patent Number: 5,461,235
[45] Date of Patent: Oct. 24, 1995

[54] MASS SPECTROMETRY APPARATUS AND METHOD RELATING THERETO

[76] Inventors: John S. Cottrell, 12A Chalcot Gardens, London, United Kingdom, NW3 4YB; Milton Keynes, 3 Lullingstone Dr., Bancroft Park, United Kingdom, MK13 0RB

[21] Appl. No.: 167,993

[22] PCT Filed: Jun. 19, 1991

[86] PCT No.: PCT/GB92/01109

§ 371 Date: Dec. 21, 1993

§ 102(e) Date: Dec. 21, 1993

[87] PCT Pub. No.: WO93/00701

PCT Pub. Date: Jan. 7, 1993

[30] Foreign Application Priority Data

Jun. 21, 1991 [GB] United Kingdom ............ 9113560

[51] Int. Cl.[6] ............... B01D 59/44; H01J 49/00
[52] U.S. Cl. ............... 250/288; 250/423 P; 250/282
[58] Field of Search ............... 250/281, 282, 250/288, 423 P

[56] References Cited

U.S. PATENT DOCUMENTS

| 3,521,054 | 7/1970 | Poschenriede et al. | 250/423 P |
| 3,698,797 | 10/1972 | Brown et al. | 350/266 |
| 5,045,694 | 9/1991 | Beavis et al. | 250/282 |
| 5,288,644 | 2/1994 | Beavis et al. | 250/282 |

Primary Examiner—Bruce C. Anderson
Attorney, Agent, or Firm—Flehr, Hohbach, Test, Albritton & Herbert

[57] ABSTRACT

A mass spectrometry apparatus includes means to irradiate a specimen with a beam of radiation to desorb ions for mass analysis. The apparatus comprises means for deflecting and scanning the beam and attenuator means arranged to vary the attenuation of the beam such that the attenuation is a function of the beam position in the scan.

37 Claims, 3 Drawing Sheets

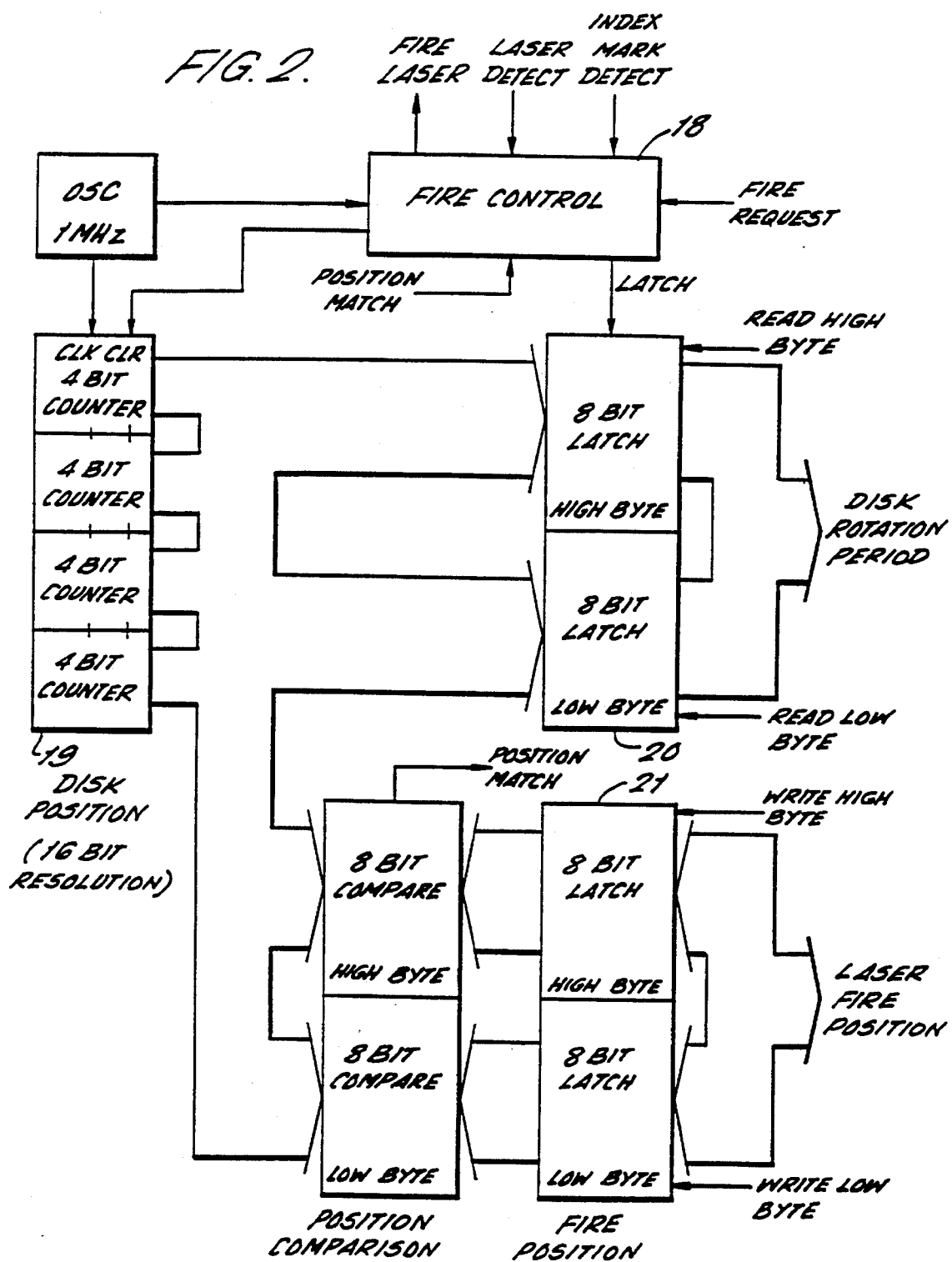

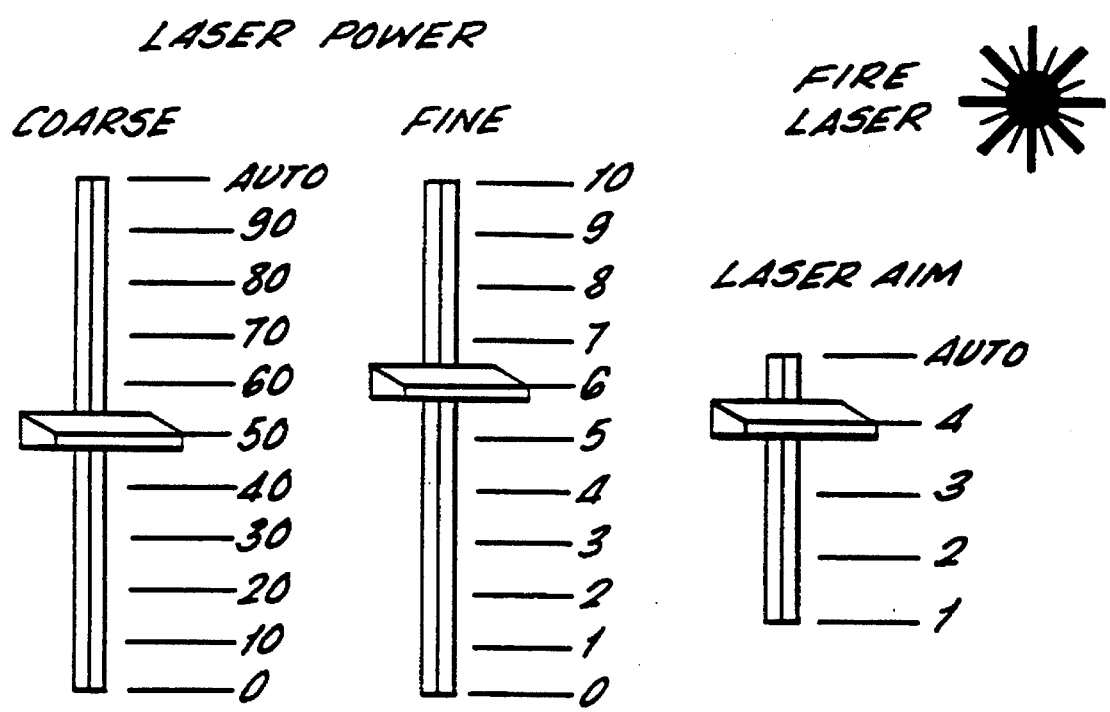

MASS SPECTROMETRY APPARATUS AND METHOD RELATING THERETO

This invention relates to a Mass Spectrometry apparatus and a method of Mass Spectrometry and, in particular, to a Mass Spectrometry apparatus and method for use in Laser Desorption. Mass Spectrometry (LDMS). In LDMS, ions are sputtered from the surface of a condensed phase sample by photon bomardment and subjected to mass analysis.

There are many embodiments of LDMS which differ in detail. In the preferred procedure described by M. Karas et. al. (Int. J. Mass Spectrom. Ion Processes, 78 53 (1987)), a large molar excess of a matrix which has a strong absorption at the wavelength of the incident radiation is mixed with the sample to be analysed. For example, a sample of bovine insulin was dissolved in an aqueous solution containing a thousand-fold molar excess of Nicotinic Acid (59-67-6). A drop of the solution was placed on a metal plate, evaporated to dryness, introduced into the mass spectrometer, and irradiated with 266 nm ultraviolet photons from a frequency quadrupled pulsed Neodymium YAG laser. Desorbed ions were accelerated to an energy of 3 keV and analysed by measuring their time of flight to an electron multiplier detector.

Ions can only be produced from those regions of the sample deposit which are irradiated by the laser beam. Sample which is not irradiated is wasted. In order to achieve the required power density of $10^{6.7}$ Watts per square cm from a low power laser, the beam is focused to a small spot, typically 0.1 mm diameter. It is not practical to load and confine the sample to such a limited region, so there exists a requirement to raster the laser beam over a larger area.

There are many devices available for deflecting laser beams with the necessary speed and precision, but they are either too complex, too bulky, or too expensive to be incorporated into a simple and inexpensive mass spectrometer. Examples of prior art include mirrors mounted on motorised spindles, mirrors mounted on galvanometer armatures, and mirrors positioned by other types of actuator such as piezo-electric crystals, voice-coils, stepper motors, and the like.

In LDMS, good quality results are only obtained when the laser irradiance is close to an optimum setting. This optimum setting varies according to the nature of the sample and the choice of chemical matrix, so it is also necessary to provide a means of accurately adjusting the laser power density.

The method described by M. Karas et. al. (Int. J. Mass Spectrom. Ion Processes, 78 53 (1987)), involves achieving a coarse adjustment by attenuating the beam power using an absorbant glass filter and achieving fine adjustment by altering the sharpness of the beam focus. Other systems have been described which also rely on manual selection of fixed absorbance filters.

Continuous, remote adjustment of laser power is necessary to achieve the ease of use required for a mass spectrometer to be commercially acceptable. This could be achieved by using a motor actuated gradient density filter. Alternatively, U.S. Pat. No. 4,398,806 describes a variable attenuator using the principle of Fresnel reflection from four counter-rotating glass wedges.

The invention provides a mass spectrometry apparatus including means to irradiate a specimen with a beam of radiation to desorb ions for mass analysis, the apparatus comprising means for deflecting and scanning said beam, and attenuator means arranged to vary the attenuation of said beam such that the attenuation is a function of the beam position in the scan.

For particular embodiments the beam of radiation is monochromatic. Those skilled in the art will appreciate that no source of radiation emits truly monochromatic radiation in the sense of radiation of a single or unique wavelength. However, radiation of a very narrow band of wavelengths can be obtained, for example, from some lasers.

The present invention enables a single scan of a sample by a beam of radiation to produce results for different power densities of radiation incident on the sample. Such results may be used, in LDMS, by distinguishing the optimum results for an optimum setting or simply as a greater pool of results from which information regarding the sample can be obtained.

Advantageously, the apparatus is arranged to provide the same attenuation at a plurality of beam positions in the scan enabling a plurality of results to be produced for the same power density. Those skilled in the art will appreciate the advantages of being able, in effect, to repeat an analysis in one scan of the sample target. Such an arrangement of the apparatus may include polarising means arranged to vary the attenuation of said beam and preferably a first and a second polariser, at least one of the polarisers being rotatable.

Said means for deflecting and scanning said beam may comprise a rotatably mounted prism, enabling deflection of said beam with an apparatus which is relatively simple, reliable, compact and inexpensive.

To reduce further the complexity of the apparatus, one of the polarisers can be not rotatable. Furthermore, one of the polarisers is advantageously arranged to rotate in phase with said prism and may be fixed to a face of said prism. Thus, both scanning and attenuating the beam can be achieved simultaneously by a single mechanically moveable component. The need for mirrors mounted on spindles, on galvanometer armatures, or actuated by piezoeletric crystals, voice coils, stepper motors or other relatively complex hardware used in the prior art therefore avoided. Furthermore, the need for independently actuated variable attenuators such as described in the prior art is also removed.

The present invention further provides a method of mass spectrometry including irradiating a specimen with a beam of radiation to desorb ions for mass analysis, and comprising the steps of deflecting and scanning said beam and attenuating said beam such that the attenuation is a function of the beam position in the scan.

Another aspect of the present invention provides a mass spectrometry apparatus including means to irradiate a specimen with a beam of photons to desorb ions for mass analysis, the apparatus comprising a first mechanically moveable optical element for deflecting said beam and a second mechanically moveable optical element for attenuating said beam, wherein the optical elements are mechanically coupled together such that the attenuation is a function of the beam position in the scan.

In one embodiment the first and second optical elements are provided by a combined optical element comprising a prism. In this embodiment, the prism may comprise a material having a predetermined optical density. Thus, the attenuation o f the beam is s imply dependant on the thickness of the prism in the beam path.

An embodiment of the present invention will now be described by way of example only, and with reference to the accompanying drawings, in which:

FIG. 2 shows control circuitry for use with the embodiment of FIGS. 1A and 1B; and FIG. 3 show a control interface for use with the embodiment of FIGS. 1A and 1B.

Figure 1A:
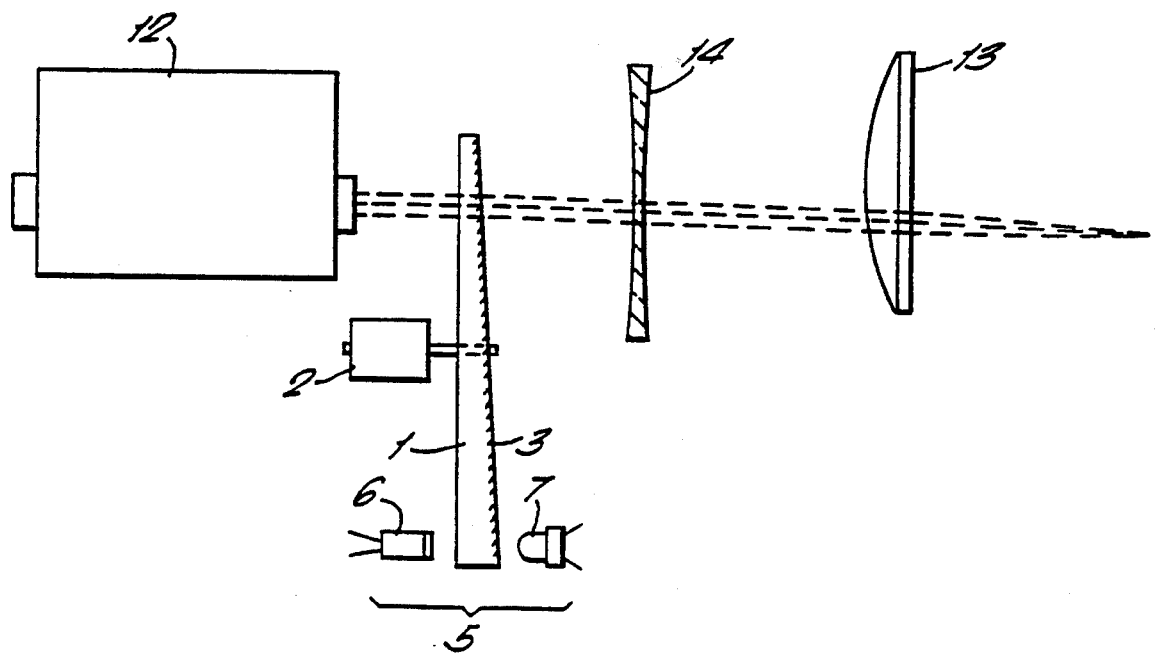
FIG. 1A shows an apparatus for use in Laser Desorption Mass Spectrometry incorporating an embodiment of an apparatus according to the present invention.
Figure 1B:
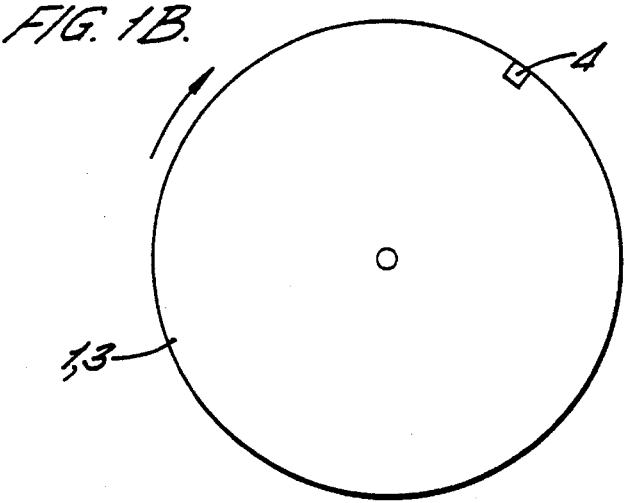
FIG. 1B shows a view of a rotatable prism for use with the apparatus of FIG. 1A.

In FIGS. 1A and 1B, a wedge plate 1, which is effective as a prism, is mounted on the spindle of a motor 2, which may conveniently be a small DC electric motor. One face of the wedge plate has a layer of dichroic polarizing material 3 laminated to it. On the periphery of the wedge plate is an opaque index mark 4 which is used for timing the rotation period of the plate 1. Each time the opaque index mark 4 passes through a sensing assembly 5, it interrupts the illumination of a photodiode 6 by a light emitting diode 7.

Monochromatic light from a laser 12 passes through the plate 1 and is deflected by the prism action of the wedge. As the plate 1 rotates, the angle of deflection changes so as to sweep the beam path around the surface of a cone coaxial with the undeviated beam. The angle through which the beam is deviated is given by the familiar prism equation:

$$\theta = (n-1)\propto$$

where $\theta$ is the angle of deflection, $\propto$ is the wedge angle, and n is the index of refraction of the wedge plate. For quartz at 337 nm, n=1.479 so that a plate of wedge angle 0.4° causes a deflection of 0.2°. To calculate the movement of the beam focus on a sample target (not shown), it is necessary to take account of the effect of a focusing lens 13. If the focal length of this element 13 is L and the beam is brought to a nominal point focus, then the deflection sweeps out a circle on the target of radius L*Sin$\theta$.

By placing a fixed polarizing element 14 in the path of the beam, the overall transmission can be varied from a maximum when the polarization axes of the two elements are parallel to a minimum when they are crossed. Thus, the beam is modulated at a rate which is twice the rotational frequency of the plate 1. If the desired power attenuation factor is (say) 0.5, there is a choice of four deflection angles which provide this level of attenuation.

Co-ordination of the firing of the laser 12 with the rotation of the plate 1 is effected by control circuitry illustrated in FIG. 2. The circuit includes "fire control" logic 18 which interfaces between the wedge 1, the laser 12 and the control circuitry. Each time the illumination of the photodiode 6 by the light emitting diode 7 is interrupted by the index mark 4, a signal "index mark detect" is produced which instructs the "fire control" logic 18 to write the value of a "disk position" 16 bit counter 19 into a "disk rotational period" 16 bit latch 20. As the counter 19 is then reset to time the next rotation of the plate 1, the value of the 16 bit counter 19 at any particular instance of time, corresponds to the angular position or "disk position" of the plate 1. The value of the 16 bit counter 19 stored in the 16 bit latch 20 accordingly corresponds to a full rotational period of the plate 1 and is referred to below as $N_r$. The angular position of the plate 1 at which the laser 12 is to be fired is determined by the deflection and attenuation of the beam of radiation required. Deflection and attenuation values are encoded as described below to give a 2 byte word $N_f$ which is written to a second 16 bit latch 21 "fire position". When the value of the "disk position" counter 19 matches the value of the "fire position" latch 21, a "fire request" held by the "fire control" logic 18 is allowed to fire the laser 12. A photodiode sensor (not shown) provides a confirmation signal "laser detect" to the "fire control" logic 18 to confirm that the laser has been fired. For simplicity, the plate 1 is rotated at a constant speed.

It is clear from the preceding description that the deflection function is coupled to the attenuation function. However, this need not be apparent to the user. The control interface can offer seemingly continuous adjustment of laser power with a choice of four aiming positions at any given power setting. Using commercially available polarization components, a transmission range from 20% down to almost 0% is achievable. In the preferred implementation of this invention, the control interface has the appearance illustrated in FIG. 3. The power setting can be adjusted from P=0 (0% transmission) to P=100 (20% transmission). Four positions are offered for laser aim (A=1 to 4). The equation for converting a power setting (P) and an aim setting (A) into a count value to be passed to the control logic is simply:

$$N_f = N_r((A-1)/4 + (C-45)/360 \pm (P-50)/400)$$

where $N_f$ is the counter value at which the laser should be fired, $N_r$ is the counter value for one complete rotational period, and C is the offset angle between the timing mark and the first position at which the beam transmission factor is a minimum. The final term is added when A is even and subtracted when A is odd.

A practical rotational frequency for the wedge plate 1 is 1200 rpm. With this rotational frequency, the period of a single rotation is 50 milliseconds. Using a 1 MHz counter allows the laser to be fired through the disk with a timing precision of 1 part in 50,000, which translates to a more than adequate angular precision. Delays in the control logic and laser firing sequence are extremely short compared with the rotational period of the wedge plate 1 so that, although the wedge is rotating continuously, it might as well be stationary as far as the control sequences are concerned. The maximum wait between a request to fire the laser and its execution is one rotational period, 50 ms, a delay so short as to be unnoticable to the user.

Instead of using a pair of polarisers to attenuate the beam, a prism comprising a material having a predetermined optical density may be used, simplifying the apparatus. If the prism was a simple wedge mounted for rotation, the attenuation would vary from a minimum value where thickness of the prism in the beam path is a minimum, to a maximum value where the thickness of the prism in the beam path is a maximum, per one complete rotation of the prism. If the same power density was required at more than one position in the scan, the prism could be shaped so as to deflect the beam to a number of different positions for the same thickness of prism in the beam path. Alternatively, the prism may comprise a plurality of materials having different predetermined optical densities to achieve the same result.

Further modifications to the embodiment described within the scope of the present invention will be apparent to those skilled in the art.

It will also be apparent to those skilled in the art that the invention as claimed is not limited to the field of Laser Desorption Mass Spectrometry. For example, the beam of radiation may be a beam of particles such as electrons, neutrons, protons or alpha particles. Alternatively, the invention may also be applied to the field of ultrasonics, so that the beam comprises photons.

We claim:

1. Apparatus for desorbing ions from a specimen for mass analysis including means to irradiate a specimen with a beam of radiation to desorb the ions, means for deflecting and scanning said beam to irradiate different regions of the specimen, and attenuator means arranged to vary the attenuation of said beam such that the attenuation is a function of the beam position in the scan.

2. Apparatus as claimed in claim 1, wherein said beam of radiation is monochromatic.

3. Apparatus as claimed in claim 2, wherein said monochromatic beam of radiation is generated by a laser.

4. Apparatus as claimed in claim 1, wherein said beam of radiation is electromagnetic.

5. Apparatus as claimed in claim 4 wherein said attenuator means includes polarising means arranged to vary the attenuation of said beams.

6. Apparatus as claimed in claim 5, wherein said polarising means comprises a first and a second polariser, at least one of the polarisers being rotatable.

7. Apparatus as claimed in claim 6, wherein one of the polarisers is not rotatable.

8. Apparatus as claimed in claim 6, wherein one of the polarisers is arranged to rotate in phase with said prism.

9. Apparatus as claimed in claim 8, wherein said one of the polarisers is fixed to a face of said prism.

10. Apparatus as claimed in claim 1, wherein said means for deflecting and scanning said beam comprises a rotatably mounted prism.

11. Apparatus as claimed in claim 10, including means to rotate said prism at a constant speed.

12. Apparatus as claimed in claim 10, including control means arranged so that said beam is only generated at a predetermined time corresponding to a predetermined angular position of said prism.

13. Apparatus as claimed in claim 1, arranged to provide the same attenuation at a plurality of beam positions in the scan.

14. Apparatus as claimed in claim 1, including means for focusing said beam onto a target.

15. A method of desorbing ions from a specimen for mass analysis including the steps of irradiating a specimen with a beam of radiation to desorb ions, deflecting and scanning said beam to irradiate different regions of the specimen and attenuating said beam such that the attenuation is a function of the beam position in the scan.

16. Method as claimed in claim 15, wherein said beam of radiation is monochromatic.

17. Method as claimed in claim 16, wherein said monochromatic beam of radiation is generated by a laser.

18. Method as claimed in claim 15, wherein said beam of radiation is electromagnetic.

19. Method as claimed in claim 15, wherein said step of deflecting and scanning said beam comprises the step of inputting said beam into a rotating prism whereby a conical scan is produced.

20. Method as claimed in claim 19, including the step of rotating said prism at a constant speed.

21. Method as claimed in claim 19, including the step of generating said beam at a predetermined time corresponding to a predetermined angular position of said prism.

22. Method as claimed in claim 15, wherein the same attenuation is provided at a plurality of beam positions in the scan.

23. Method as claimed in claim 22, wherein polarising means is arranged to vary the attenuation of said beam.

24. Method as claimed in claim 23, wherein said polarising means comprises a first and a second polariser, at least one of the polarisers being rotatable.

25. Method as claimed in claim 24, wherein one of the polarisers is not rotatable.

26. Method as claimed in claim 24, wherein one of the polarisers is arranged to rotate in phase with said prism.

27. Method as claimed in claim 26, wherein said one of the polarisers is fixed to a face of said prism.

28. Method as claimed in claim 15, including the step of focusing said beam onto a target.

29. Apparatus for desorbing ions from a specimen for mass analysis. including means to irradiate a specimen with a beam of photons to desorb ions, a first mechanically moveable optical element for deflecting and scanning said beam to irradiate different regions of the specimen, and a second mechanically moveable optical element for attenuating said beam, wherein the optical elements are mechanically coupled together such that the attenuation is a function of the beam position in the scan.

30. A mass spectrometry apparatus as claimed in claim 29, wherein the first and second optical elements are provided with a combined optical element comprising a prism.

31. A mass spectrometry apparatus as claimed in claim 30, wherein said prism comprises a material having a predetermined optical density.

32. A mass spectrometry apparatus as claimed in claim 29, wherein said first optical element is a prism and said second optical element comprises a pair of polarisers, at least one of the polarisers being rotatable.

33. A mass spectrometry apparatus as claimed in claim 32, wherein one of the polarisers is not rotatable.

34. A mass spectrometry apparatus as claimed in claim 32, wherein one of the polarisers is arranged to rotate in phase with said prism.

35. A mass spectrometry apparatus as claimed in claim 34, wherein said one of the polarisers is fixed to a face of said prism.

36. A laser desorption mass spectrometer comprising means for desorbing ions from a specimen including means to irradiate a specimen with a beam of radiation to desorb the ions, means for deflecting and scanning said beam to irradiate different regions of the specimen, attenuator means arranged to vary the attenuation of said beam such that the attenuation is a function of the beam position in the scan, and means to mass analyze the desorbed ions.

37. A method of laser desorption mass spectrometer analysis comprising the steps of irradiating a specimen with a beam of radiation to desorb ions for mass analysis, deflecting and scanning said beam to irradiate different regions of the specimens, attenuating said beam such that the attenuation is a function of the beam position in the scan, and mass analyzing said desorbed ions.

* * * * *